No. 706,706. Patented Aug. 12, 1902.
C. J. WHITING.
SAFETY CATCH FOR WHEELED EARTH SCRAPERS.
(Application filed June 5, 1902.)
(No Model.)
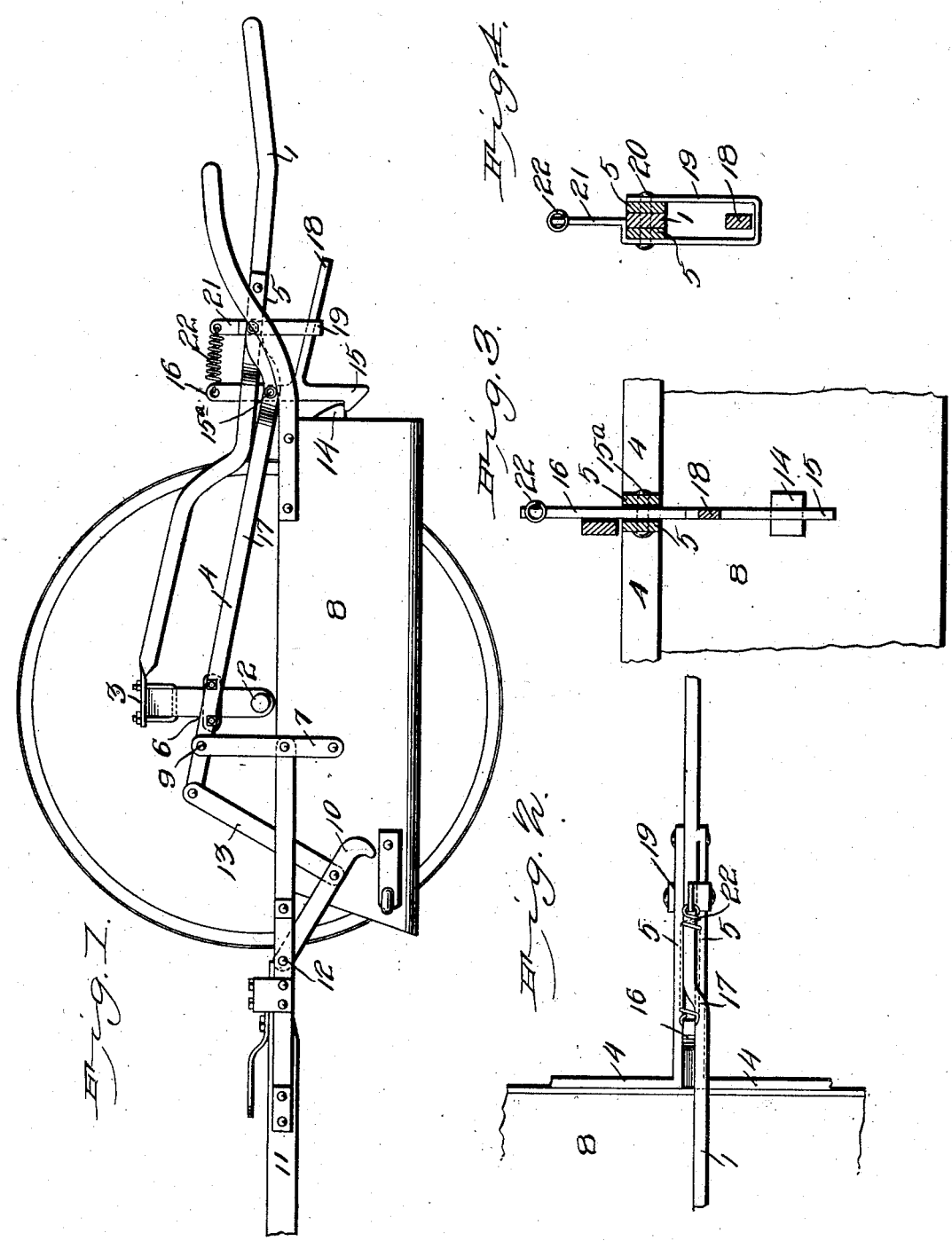
Witnesses
C. J. Whiting, Inventor
by Attorneys

UNITED STATES PATENT OFFICE.

CHARLES J. WHITING, OF LASALLE, ILLINOIS.

SAFETY-CATCH FOR WHEELED EARTH-SCRAPERS.

SPECIFICATION forming part of Letters Patent No. 706,706, dated August 12, 1902.

Application filed June 5, 1902. Serial No. 110,342. (No model.)

*To all whom it may concern:*

Be it known that I, CHARLES J. WHITING, a citizen of the United States, residing at Lasalle, in the county of Lasalle and State of Illinois, have invented a new and useful Safety-Catch for Wheeled Earth-Scrapers, of which the following is a specification.

My invention is an improved safety-catch for wheeled earth-scrapers, the object of my invention being to effect improvements in the catch by means of which the lever is locked to the rear end of the bowl or box whereby the catch is prevented from becoming prematurely disengaged from the bowl or box and prevented from dropping far enough to catch in the top or inside of the bowl or box when the lever is being lowered to hook up the bowl or box; and my invention consists in the peculiar construction and combination of devices hereinafter fully set forth and claimed.

In the accompanying drawings, Figure 1 is a side elevation, with the near wheel removed, of a wheeled earth-scraper provided with a safety-catch embodying my improvements. Fig. 2 is a detail top plan view of the same. Fig. 3 is a detail rear elevation, partly in section. Fig. 4 is a detail sectional view.

The wheeled earth-scraper here shown is of the form well known and now in common use. The lever 1 has its front end secured to the cranked axle 2, as at 3, and is provided with side bars 4, the rear ends of which are secured to opposite sides of the lever, as at 5, and which side bars are secured near their front ends to the cranked portion of the axle, as at 6. The hangers 7, which support the front portion of the bowl or box 8, have their lower ends pivotally connected to the sides of the latter and their upper ends pivotally connected to the side bars 4 at a suitable distance from their front ends, as at 9, and the hooks 10, which support the box or bowl while the same is being raised from the ground, are connected to the tongue 11, as at 12, and to the front ends of the side bars 4 by links 13.

On the rear side of the bowl or box is the usual cleat 14. In the embodiment of my invention I provide the catch 15, which is here shown as pivoted between the rearward extension of the side bars 4, as at 15ª, and as having an upwardly-extending arm 16 disposed on one side of the lever 1, the latter being offset laterally, as at 17, to clear said arm. From the rear side of the catch 15 projects the lever-arm 18. When the scraper is in the position shown in Fig. 1, with the bowl or box elevated, the catch 15 engages the cleat 14 to connect the lever 1 to the rear end of the bowl or box, so that by means of said lever the bowl or box may be dumped.

A stirrup 19, which is preferably of the form shown in Fig. 4, is secured to and depends from the rearward extensions 5 of the side bars 4 by a bolt or rivet 20, which passes through the sides of said hangers, through said side extensions, and also through the lever 1. The said stirrup forms a guide and support for the lever-arm 18 of the latch or catch 15, and the lower side of said stirrup is engaged by said lever-arm when the said catch is in the position shown in Fig. 1. The said stirrup or guide 19 is provided with a vertical post 21, which extends above the lever 1 at a suitable distance in rear of the catch 15. A coiled retractile spring 22 connects the said post to the arm 16 of the catch. The said spring keeps the catch in engagement with the cleat 14, so that it cannot become prematurely disengaged therefrom by the jolting incident to the moving of the machine or from other causes, and hence the bowl or box remains locked securely until it is desired to dump the contents of the same by elevating the rear end of the lever 1. The stirrup 19, which forms the guide for the lever-arm 18, limits the downward movement of the latter, and hence correspondingly limits the forward movement of the lower end of the catch, so that the latter cannot become caught within the rear end of the bowl or box.

Heretofore machines of this class have been provided with a form of catch which is liable to become prematurely disengaged from the cleat and is also liable when the lever 1 has been moved upwardly to dump the bowl or box to become caught in the rear wall of the latter, and thus cause great annoyance to the operator and a considerable loss of time. My improved safety-catch obviates both of these objections. The spring prevents the premature disengagement of the catch from the cleat, and the stirrup 19 by limiting the downward movement of the lever-arm 18 prevents the catch from becoming disposed in such a position that it is liable to catch in the rear wall of the bowl or box. The stirrup also serves to prevent lateral movement of the lower portion of the catch, and hence prevents the latter from becoming disengaged from the cleat from this cause.

It will be understood that my improved safety-catch may be readily attached to any of the forms of wheeled earth-scrapers now in common use.

Having thus described my invention, I claim—

1. In a wheeled scraper of the class described, a catch pivoted to the lever, adapted to engage the cleat on the rear end of the bowl or box, having an arm 16, extending upwardly from its pivot, and also having a rearwardly-extending lever-arm 18, in combination with a stirrup secured to the lever in rear of the catch, forming a guide and stop for the lever-arm 18, the latter extending therethrough and working therein, said stirrup having an upwardly-extending post 21, and a spring connecting said post to the arm 16 of the catch, substantially as described.

2. In a wheeled scraper of the class described, a pivoted catch carried by the lever and adapted to engage a cleat on the rear end of the bowl, or box, a spring to keep said catch in engagement with said cleat, means to prevent lateral movement of said catch, and means to limit the pivotal movement thereof when disengaged from the cleat, substantially as described.

3. In a wheeled scraper of the class described, a pivoted catch carried by the lever and adapted to engage a cleat on the rear end of the bowl or box, said catch having a rearwardly-extending operating-arm, and a guide for the latter, carried by the lever, said guide preventing lateral movement of the catch and coacting with the arm to limit the pivotal movement of the catch when disengaged from the cleat, substantially as described.

In testimony that I claim the foregoing as my own I have hereto affixed my signature in the presence of two witnesses.

CHARLES J. WHITING.

Witnesses:
JOHN H. DIGGLE,
DENIS McGUIRE.